United States Patent
Mauro et al.

(10) Patent No.: US 9,879,759 B1
(45) Date of Patent: Jan. 30, 2018

(54) PRECISION POSITIONING DEVICE AND STAGE INCORPORATING A GLOBOID WORM AND ITS MANUFACTURE

(71) Applicants: George Mauro, Sebastian, FL (US); Dennis Willard Davis, Palm Bay, FL (US)

(72) Inventors: George Mauro, Sebastian, FL (US); Dennis Willard Davis, Palm Bay, FL (US)

(*) Notice: Subject to any disclaimer, the term of this patent is extended or adjusted under 35 U.S.C. 154(b) by 150 days.

(21) Appl. No.: 14/756,216

(22) Filed: Aug. 18, 2015

Related U.S. Application Data

(60) Provisional application No. 62/070,266, filed on Aug. 19, 2014.

(51) Int. Cl.
| | |
|---|---|
| *F16H 1/16* | (2006.01) |
| *F16H 1/20* | (2006.01) |
| *F16H 55/22* | (2006.01) |
| *B23F 13/06* | (2006.01) |

(52) U.S. Cl.
CPC ............. *F16H 1/203* (2013.01); *B23F 13/06* (2013.01); *F16H 55/22* (2013.01)

(58) Field of Classification Search
CPC .... F16H 1/16; F16H 2057/0213; F16H 55/24; F16H 2057/126; F16H 2057/125; F16H 1/206; F16H 1/203; F16H 57/022
See application file for complete search history.

(56) References Cited

U.S. PATENT DOCUMENTS

| | | | | |
|---|---|---|---|---|
| 3,463,030 A * | 8/1969 | Nuccel | ...................... | F16H 1/16 74/396 |
| 3,615,068 A * | 10/1971 | Edelstein | ............... | A47B 11/00 108/104 |
| 4,040,307 A * | 8/1977 | Koster | ...................... | F16H 1/16 74/425 |
| 4,586,260 A | 5/1986 | Baxter | | |
| 4,683,770 A * | 8/1987 | Nettmann | ................. | F16H 1/16 74/405 |
| 5,475,930 A * | 12/1995 | Kimura | ...................... | F16H 1/16 33/290 |
| 5,749,556 A * | 5/1998 | Matsuoka | .............. | F16M 11/08 248/349.1 |
| 2007/0125193 A1* | 6/2007 | Augustine | ................. | F16H 1/16 74/339 |
| 2008/0041178 A1* | 2/2008 | Ozsoylu | .................. | F16H 55/24 74/425 |
| 2011/0317951 A1 | 12/2011 | Mauro | | |

* cited by examiner

*Primary Examiner* — Jake Cook

(57) ABSTRACT

The device is a precision motion right angle drive for use with linear and rotary stages which employs a combination of globoid worm and small diameter star gear. Coaxial with the star gear, on the same shaft, is a spur gear which drives the rotary stage gear or a linear rack. The thin star gear achieves meshing accuracy with the globoid worm permitting a large tooth angle for direct preloading without jamming. This gear combination eliminates backlash, allows a low gear ratio for low globoid worm speed, and enables the use of an ordinary spur gear to engage the stage gear without backdrive or backlash. Further, it allows for gear contact area to compensate for the thinness of the star gear. An embodiment including an integrated bearing rotary stage permits flexibility of application and avoidance of need for custom bearing designs by achieving high motion precision at low cost.

11 Claims, 14 Drawing Sheets

121

121

PRECISION POSITIONING DEVICE AND STAGE INCORPORATING A GLOBOID WORM AND ITS MANUFACTURE

CROSS REFERENCE TO RELATED APPLICATIONS

This application claims the benefit of provisional patent application Ser. No. 62/070,266 filed 2014 Aug. 19.

BACKGROUND

Precision positioning stages, both linear and rotary, are used for laboratory and industrial applications including fiber optic and optical alignment systems.

Prior art technologies include means to achieve precision linear or rotational motion using either open-loop or closed-loop methodologies. In the context of right angle drives, of relevance are means that achieve precision motion while converting rotation along one axis into rotation along a second axis, orthogonal to the first. Application to linear output motion, concerns means of converting precise rotation about a first axis into precise translation along a second axis, orthogonal to the first. Various drive systems employed for stage motion include lead screws, recirculating ball screws, worm drives, gearboxes, and flexible shaft couplings. Prime mover actuation means include manual, electric stepper and servo motors, piezoelectric, magnetostrictive, and hydraulic. Subsidiary to these general design considerations, are supporting technologies relevant to the implementation disclosed herein, such as robust bearing designs, globoid worms, and motion encoders (.

Conventional precision motorized rotary stages exhibit a limited diameter clear aperture in comparison to the bearing footprint, with significant surrounding housing bulk, and a large motor assembly (protrusion) in proportion to the stage size (often conventional designs exhibit a motor housing larger than the stage.

What is needed is a compact mechanism that provides precision rotational drive to any size rotational stage with minimal customization; such a mechanism would not exhibit backlash. The problem for rotational stages is making a full line of standard and custom sizes without the prohibitive expense of new custom high precision parts for each variation. The use of such a mechanism to meet these objectives would be advantageous for driving linear stages, as well.

Globoid Worms

Worms are relevant to the present disclosure and more particularly, globoid worms, given features that can be specially adapted to address issues concerning precision motion drives. With respect to globoid worms, among the various names used to denote this type of gear are the following: globoid worm, hourglass worm, wormoid gear, double enveloping gear, enveloping worm, double enveloping worm, double throated worm, double globoid worm, and cone drive.

FIG. 1 depicts the different types of various prior art worms and associated worm wheels, absent depiction of the associated teeth; (a) cylindrical worm and cylindrical worm wheel, (b) cylindrical worm and enveloping worm wheel, (c) enveloping worm and cylindrical worm wheel, and (d) enveloping worm and enveloping worm wheel. The globoid (enveloping) worm is shown in FIGS. 1c and 1d.

Advantages of the globoid worm over a traditional worm comprise increased driving efficiency (6-10% higher on 25:1 ratio) and increased loading capacity (about 30%). The most commonly cited disadvantages concerning conventional implementations of globoid worm drives include higher manufacturing cost and sensitivity of the enveloping pinion to the axial location. In order for the conventional device to be efficient (or turn at all), stage carrier backlash (moving platform relative to stage body) must be introduced. Due to the tooth geometry, the globoid worm can mesh not only with a mating enveloping gear but also with a correctly designed cylindrical helical gear. The substantial thickness of the mating gear is to exploit the heavy load advantage of the globoid worm drive.

There is need to exploit the advantages of the globoid worm for precision motion applications while overcoming the cited disadvantages.

SUMMARY OF THE INVENTION

The chief goal of the presently disclosed concept is to achieve a full anti-backlash, lightweight, high-speed, customizable, precision motion system implemented with a mechanism which drives motion with an inexpensive spur gear. The conceived solution is a right angle drive which exhibits two instances of independently-adjustable preload to maintain all the gears in the gear train in tight contact to avoid backlash. The first instance of preload holds a worm and worm wheel in tight mesh and the second instance of preload holds a driving spur gear rigidly in contact with a stage spur gear. This drive mechanism removes all backdrive and backlash from the moving stage without excessive frictional loss under preload. The right angle drive can be used with linear or rotary stages. For application to rotary motion, an integrated bearing design permits change in the diameter of a rotary stage without need for expensive bearing customization to achieve high accuracy of motion.

Disclosed herein is a precision motion right angle drive for use with linear and rotary stages which employs a globoid worm in concert with a worm wheel in the form of a small diameter star gear. A depiction of the globoid worm 1 is provided in FIG. 2A (This is a shaded wireframe rendering, hence the gear surfaces and edges exhibit aliasing as an artifact.). In cross section, this version of the globoid worm exhibits a shallow hourglass contour 3. The globoid worm 1 is shown meshing with the thin star gear 5 in FIGS. 2B and 2C. As shown in FIG. 2B, the star gear pressure angle 7 is one half the tooth angle 9. Coaxial with the star gear, on the same shaft, is a spur gear which drives the rotary stage gear or a linear rack. The globoid worm allows a much larger tooth angle for the worm wheel design than straight cylindrical worms thereby permitting direct preloading of the worm wheel with the globoid worm without jamming. The star gear (worm wheel) is made thin to improve meshing accuracy with the worm. This geometry eliminates all slop and facilitates a low (~20:1) gear ratio, thereby optimizing stage speed with minimal globoid worm speed. In order to employ a large tooth angle for the star gear and to facilitate full tooth edge contact, the star gear must be made thin. The reasonable friction provided by the star gear-worm preload allows for a minimally sized motor which contributes to lightness, and optimum speed and load force for even large rotary stages. The globoid worm enables the use of an ordinary spur gear to engage the stage gear without backdrive or backlash. Further, it allows large surface area worm-to-star gear engagement compensating for the thinness of the star gear. This linkage has the added benefit of allowing a softer material to be used for the globoid worm than the star gear and permits confinement of the critical friction lubricant to a small manageable volume based on having a small, sealed volume for this gearing. The globoid worm is small enough that the distribution of wear is even throughout the right angle drive assembly, even in the case of repetitive partial angular moves of the overall stage.

The following definitions serve to clarify the disclosed and claimed invention:

Backdrive—refers to the condition of driving the worm wheel by motion of the worm. This is made impossible with most worm wheel and worm designs by insuring that the friction angle is larger than the worm lead angle.

Backlash—refers to the amount of clearance between mated gear teeth which contributes to lost motion or slop in motion transmission in a gear train.

Drive subassembly—refers to the prime mover source of power and its coupling to the first gear subassembly to provide torque to the globoid worm to drive its motion.

First gear subassembly—refers to the globoid worm, globoid worm shaft, associated bearings and mount fixtures, all mounted on a first slide stage that permits sliding motion of the first gear subassembly in a direction perpendicular to the globoid worm axis of rotation.

Globoid worm—refers to a pinion type worm that exhibits an hourglass contour that envelopes the perimeter of an associated worm wheel and meshes with multiple worm wheel teeth at the same time. The radius of curvature of the envelope can vary from finite to infinite, thereby approaching the shape of a straight cylindrical worm.

Helical gear—refers to a cylindrical gearwheel having the tooth form generated on a helical path about the rotational axis of the wheel. This can be used in lieu of a spur gear in the present disclosure.

Integrated bearing—refers to a bearing assembly that uses three cylindrical components to form a bearing race. In the case of an inside rotor geometry these parts are a take-up ring with a partial v-groove which is the first half of an "inner bearing race", a rotor member containing a fixed v-groove which comprises the "outer bearing race", and a non-rotating member with a partial v-groove which forms the second half of an "inner bearing race". These three components captivate, within the bearing race that they jointly form, a bearing keeper and bearing set. In an outside rotor geometry, the inner and outer races are reversed. This unique design exhibits an ability to maintain a fixed rotational axis (and hence, center of rotation) in the presence of errors in positioning of the component parts that form the bearing races. In addition to achieving this motion performance, the "self-seating" nature of the bearing race construction also results in a preloaded race with no deleterious space.

Jamming—refers to the condition of two meshed gears that are immoveable relative to one another. This can occur when both sides of a gear tooth make contact simultaneously. In the current context, wedge jamming is prevented by using a large tooth angle for the worm wheel.

Locking or self-locking—refers to the property of worm configurations in which the worm wheel cannot drive the worm. Whether a worm wheel and worm will be self-locking depends on the lead angle, the pressure angle, and the coefficient of friction; however, it is approximately correct to say that a worm wheel and worm will be self-locking if the tangent of the lead angle is less than the coefficient of friction.

Preload—this refers to a force constantly applied to some portion of a mechanism. In the context of gears, this refers to force applied between the shafts of two meshing gears in a direction along the line between the respective gear centers, serving to drive the gears together. In the context of bearings, this applies to a permanent thrust load applied to the bearing, essentially using force to push the bearing so that it is secure in the groove and has no axial clearance.

Second gear subassembly—refers to the star gear and spur gear mounted on a common shaft in an associated fixture.

Slop—refers to the play or lost motion resulting from gear backlash.

Spur gear—refers to straight-cut gears, the simplest type of gear. They consist of a cylinder or disk with the teeth projecting radially, and although they are not straight-sided in form (they are usually of special form to achieve constant drive ratio, mainly involute), the edge of each tooth is straight and aligned parallel to the axis of rotation. These gears can be meshed together correctly only if they are fitted to parallel shafts. In the context of the presently disclosed right angle drive, the spur gear provides driving force to the rotational stage gear.

Star gear—refers to a special type of spur gear in which the engaging region of individual teeth exhibit straight or largely straight sides and hence have a triangular geometry when viewed along the rotation axis of the gear.

Star stage gear subassembly—refers to the star gear used as the rotation stage gear in concert with the integrated bearing and associated hardware.

Third gear subassembly—refers to the rotation stage gear and associated integrated bearing and the associated hardware.

Tooth angle—in the case of a triangularly-shaped, straight-edge gear tooth, this is the enclosed angle at the tooth apex.

Working in (also, wearing-in)—refers to the subtle machining process that occurs when the gear set is put into service and the star gear, made of a harder material than the globoid worm, creates some wear in the globoid worm that approaches a steady-state contour contributing to improved motion precision.

Worm—refers to a threaded shaft that engages a worm wheel. In the present disclosure, a globoid worm, a worm which exhibits an hourglass envelope shape, is a central component. The globoid worm with an envelope radius of curvature that is infinite comprises a straight worm.

Worm wheel—refers to the category of gears that are driven by a worm. In the case of a globoid worm, the conventional worm wheel is a spur or specially designed helical gear, either of which may be enveloping or non-enveloping. In the present disclosure, a large-tooth-angle star gear is employed as a worm wheel and is non-enveloping by nature of its thin design.

Objects and Advantages

The primary objects and advantages of the right angle drive are (1) design freedom, permitting minimal customization of the drive to address a range of positioning stage sizes, force requirements, and speeds and (2) enabling the provision for a substantially larger through hole made possible because of the elimination of conventional bulky bearing housings along with the rigid receiving pockets/bores required to sustain precision afforded by the bearing. (Thin rim bearings are impractical because the super-precision is required by the product's receiver.)

Another object and benefit of the right angle drive is to provide a light weight and low profile attachment to a rotary stage, having the compact drive system with the motor alongside and in-plane with the stage body.

A further object and benefit is instantiation of low drive friction due to mechanical advantage of the worm subassembly. A significant mechanical advantage (advantage to help protect the delicate star gear) comes from the use of the spur gear system which divides any linear or rotational pressure by the ratio of the diameter of the star gear to the spur gear atop it.

A further object and benefit is enabling a preloadable worm due to elimination of "jamming" effect by use of a large tooth angle worm wheel.

A further object and benefit is enabling low cost in comparison to conventional anti-backlash drives by avoiding the need for split gearing which is expensive and not easily customizable.

A further object and benefit is smaller motor requirements for turning power due to less drive train friction and avoidance of the jamming effect in standard worms which leads to exponentially increasing power requirements.

A further object and benefit is universal application of the same drive to various size rotational and linear stages.

A further object and benefit is elimination of lead screws and associated alignment in linear stages while guaranteeing positive drive.

A further object and benefit is the ability of the right angle drive to take full advantage of an integrated bearing in rotational stages.

DETAILED DESCRIPTION

Figure 1:
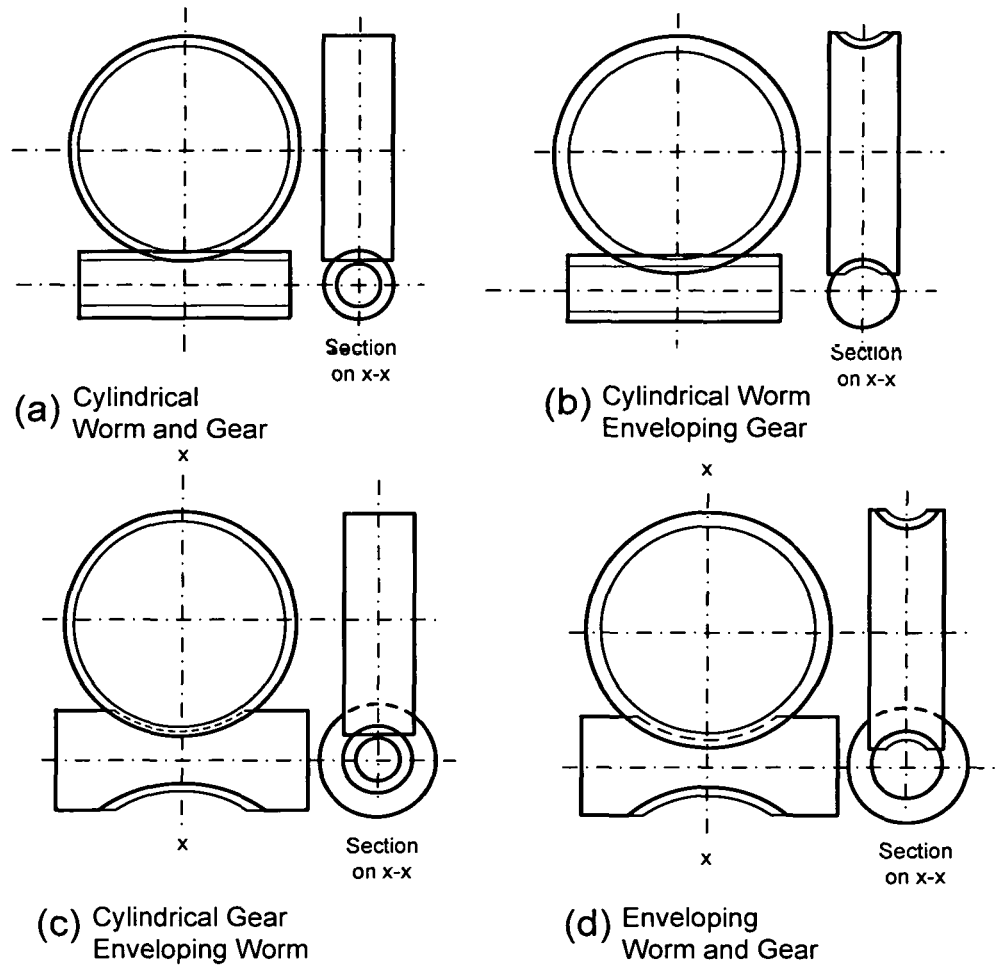
FIG. 1 is a schematic diagram of types of prior art worms including globoid gears.
Figure 2A:
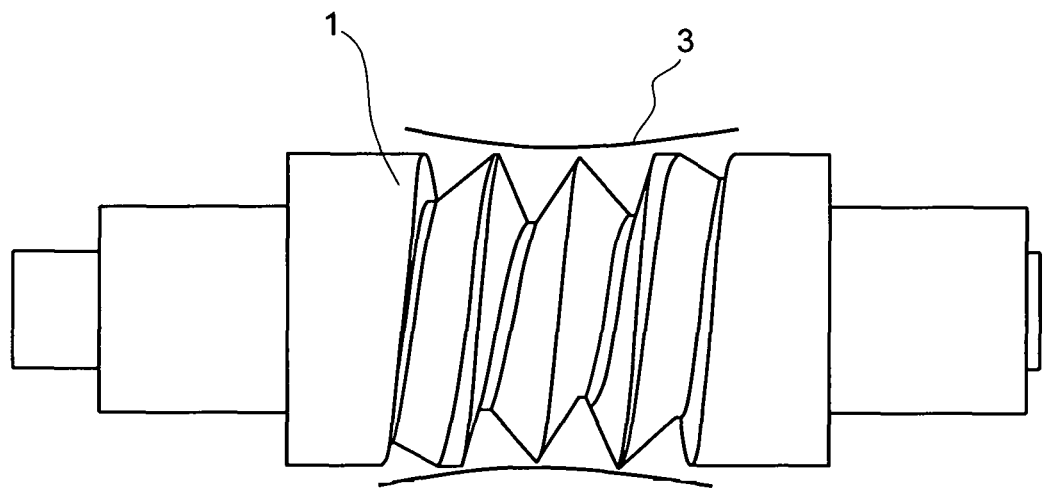
FIG. 2A is a pictorial diagram of the globoid worm.
Figure 2B:
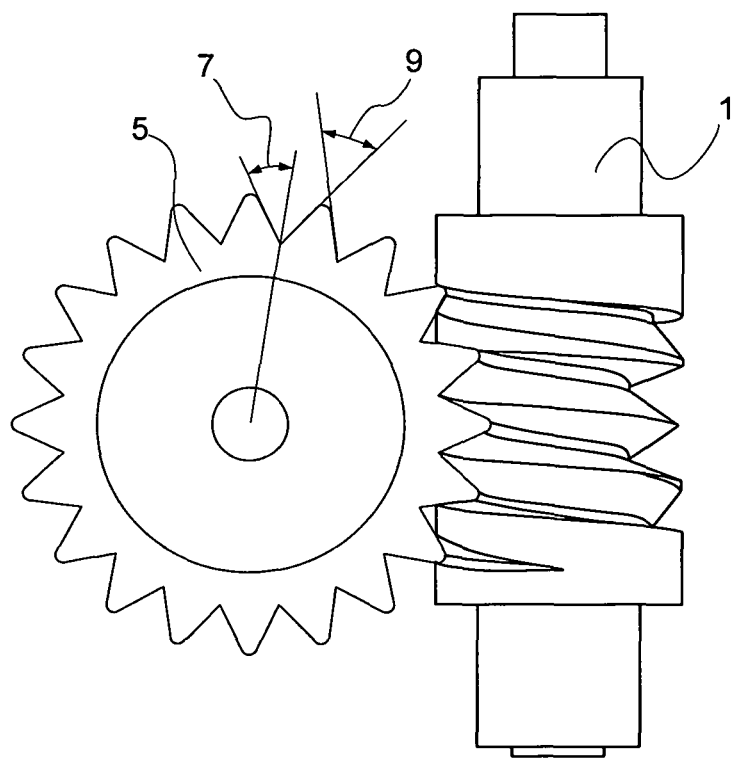
FIG. 2B is a pictorial diagram of the globoid worm in mesh with a star worm wheel, depicting the worm wheel tooth angle.
Figure 2C:
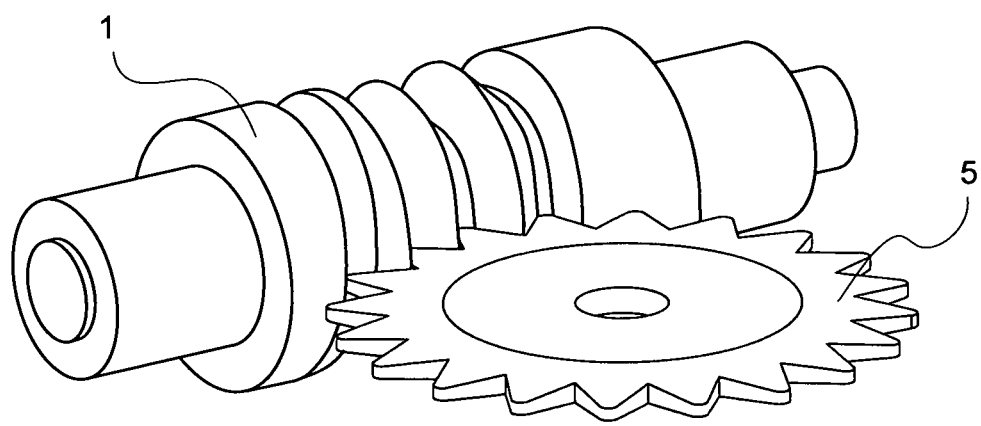
FIG. 2C is an alternate pictorial view of the globoid worm and star worm wheel

The presently-disclosed device is a precision right angle drive, useful for linear or rotation stages, comprising various subassemblies. For motion of a linear stage, the right angle drive engages a linear gear, or rack, converting rotational motion about a first axis into linear motion along a second axis perpendicular to the first. In the application to rotation stages, the device converts precise rotational motion along a first axis to rotational motion along a second axis, orthogonal to the first. Interchangeable gears permit selection of gearing ratios in this motion conversion. The integrated bearing design in the rotation stage permits flexibility of application and avoids the need for custom bearing designs as discussed below.

The right angle drive exhibits locking behavior with no backdrive. This is achieved by use of a worm geometry with a meshing worm wheel. Mounted on the same shaft as the worm wheel is a spur gear that drives either a linear or rotary stage gear (other types of gears may be used in lieu of the spur gear including helical gears). Use of a cylindrical worm implies the existence of slop to prevent jamming with a standard worm wheel tooth angle not greater than 25 degrees. In order to remove such slop, split gears would be required. These are expensive and are not easy to customize for different applications, and would require a fairly large worm, defeating the goal of compactness. Also, such a worm would have a high drive gear ratio ($\geq 90:1$) which would require correspondingly high worm speeds in relation to the rotary (or linear) stage speed. The challenge is to preload the worm wheel and worm in order to eliminate residual backlash without using a spring loaded anti-backlash worm assembly (either a split worm or a split worm wheel). The presently-disclosed right angle drive achieves this by use of a globoid worm and a worm wheel in the form of a large-tooth-angle star gear. The star gear has straight-edged or approximately straight-edged teeth, each exhibiting a triangular shape. The use of a large tooth angle allows preloading of the globoid worm and star gear without wedge jamming. In order to employ a large tooth angle for the star gear, the star gear must be made thin for the star geometry to mesh with the worm geometry. However, a side benefit of the thin star gear is improved meshing accuracy with the globoid worm. If the star gear is designed with a large number of smaller teeth, then the thickness of the teeth can be increased over those of a star gear with lesser numbers of teeth. The globoid type worm permits multiple tooth engagement at the same time in order to better support preloads and drive loads.

A cost effective approach to addressing the need for a versatile precision drive for different applications is achieved by utilizing the same right angle drive device for multiple stage diameters and sizes. Common cost-driving vital parts cannot be used in multiple sizes and versions when varying the stage dimensions using worms and lead screws. The incorporation of an easily adapted integrated bearing further supports the ability to provide a customizable precision motion product line by eliminating the need for prohibitively expensive custom conventional bearings.

First Stage of the Drive Train—Use of a Globoid Worm

Conventional means to mitigate backlash and jamming in drive systems are expensive and limit customization degrees-of-freedom. For example, an anti-backlash worm assembly typically employs two (split) gears mounted faceto-face with a spring load working against rotating one relative to the other. The worm teeth are "pinched" together by the spring which takes up the "slop" that results from the unavoidable (micro) irregularities in the worm and gear. Tight tolerances apply to fitting the gear hub. A more recent innovation is that of a split worm in which two halves of a worm are spring-loaded together to pinch the worm wheel teeth. Again, this is a relatively expensive approach.

Theoretically, a worm will not back drive if the friction angle is larger than the worm lead angle. In other words, because the lead angle on the worm is so shallow that when the gear tries to spin it, the friction between the gear and the worm holds the worm in place. This condition is met in the design of the presently-disclosed right angle drive. The globoid worm system not only prevents backdrive, but also permits the use of a large-pressure angle (hence, large tooth-angle) star gear which further allows otherwise prohibited worm-worm wheel preloading without wedge jamming (as previously stated, standard worms will jam with tooth angles much less than approximately 25 degrees), thereby eliminating residual stage backlash (and hence the need for a spring loaded anti-backlash worm) and constraint (physical interference). This approach also relieves manufacturing tolerances and reduces manufacturing cost. Any tooth angle above the conventional maximum of 25 degrees will begin exhibiting advantage with respect to jamming mitigation. In the presently disclosed right angle drive, a tooth angle of approximately 55° is chosen as an ideal value to prevent tooth disengagement under pressure and eliminate jamming force which varies exponentially as the tooth angle decreases. With a large number of smaller teeth on the star gear, the option exists for reducing the envelope curvature of the globoid worm, even using a straight worm.

A departure from prior art combinations of globoid worms and worm wheels in the present disclosure is the use of a large-tooth-angle star gear, requiring the star gear to be thin. To implement this gear geometry, a hard material such as stainless steel is used for the star gear and a softer material such as brass is used for the globoid worm. This corrects the undesirable wear attributes in conventional worm drives by avoiding localized wear on short repeated moves. The brass on the globoid worm will wear evenly and "wear in" rather than "wear out" with respect to seeking a high precision profile of the globoid worm surface over time as it is put into service.

The movement between the worm and the worm wheel faces is entirely sliding. There is no rolling component to the tooth contact or interaction. This makes them relatively difficult to lubricate. The present implementation permits a small localized lubrication volume.

Prior art teaches away from this concept of a thin, large-tooth-angle worm wheel given the goal of a globoid system to support higher loads with thick worm wheels. Also, the aforementioned cited disadvantages of globoid worm manufacturing cost and axial position sensitivity are overcome in the presently disclosed method of manufacture and use of the gear.

Figure 3:
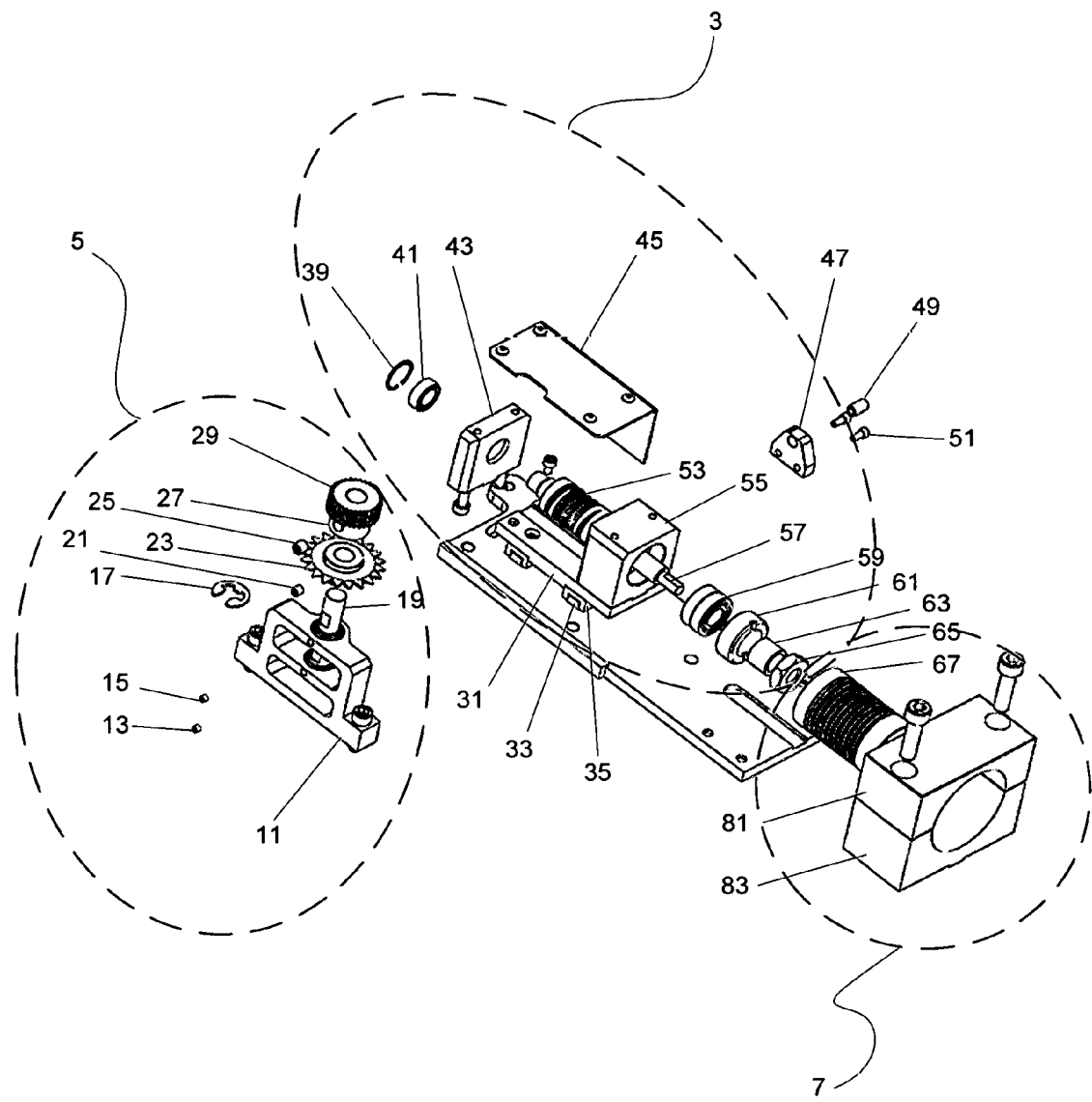
FIG. 3 is an exploded diagram of the right angle drive globoid worm subassembly, star gear-spur gear subassembly, and drive subassembly.

First Embodiment—Combination of Globoid Worm and Star Gear/Spur Gear Subassemblies In a first embodiment, the device comprises two subassemblies, a globoid worm subassembly and a star gear-spur gear subassembly, respectively. Reference is made to FIG. 3, an exploded diagram of the subassemblies. This figure does not depict the gear preload mechanisms; the subassemblies interface with each other through these preload mechanisms as will be described below. The star gear—spur gear assembly 5 comprises a star gear shaft 19 retained in gear mount 11. The star gear 23 is affixed to shaft 19 by set screw 21. The locking washer 17 retains the gear shaft axially (longitudinally). At the end of shaft 19, a drive spur gear 29 is affixed to the end of shaft 19 by a mounting set screw 25 in the hub 27 of drive spur gear 29. The star gear 23 is caused to engage the globoid worm 53 (shown in the globoid worm assembly 3) by a first preload mechanism and the drive spur gear is caused to engage a stage gear (shown in the stage gear assembly 10) by a second preload mechanism. Both preload mechanisms are described below with reference to FIGS. 4A, 4B, and 4C. The star gear shaft 19 is mounted with screws 13 and 15.

The globoid worm subassembly 3 comprises a globoid worm 53 with associated shaft 57 mounted in bearing blocks 43 and 55. Bearing 41 is retained by retainer 39 in bearing block 43. The bearing pair 59, sleeve 61, bushing 63, and take-up nut 65 cooperate to keep the globoid worm axis stable, with no unfavorable axial or transaxial motion. The globoid worm 53 with bearing blocks 43 and 55 are mounted atop globoid worm mounting base 31 with slides 33

Figure 4A:
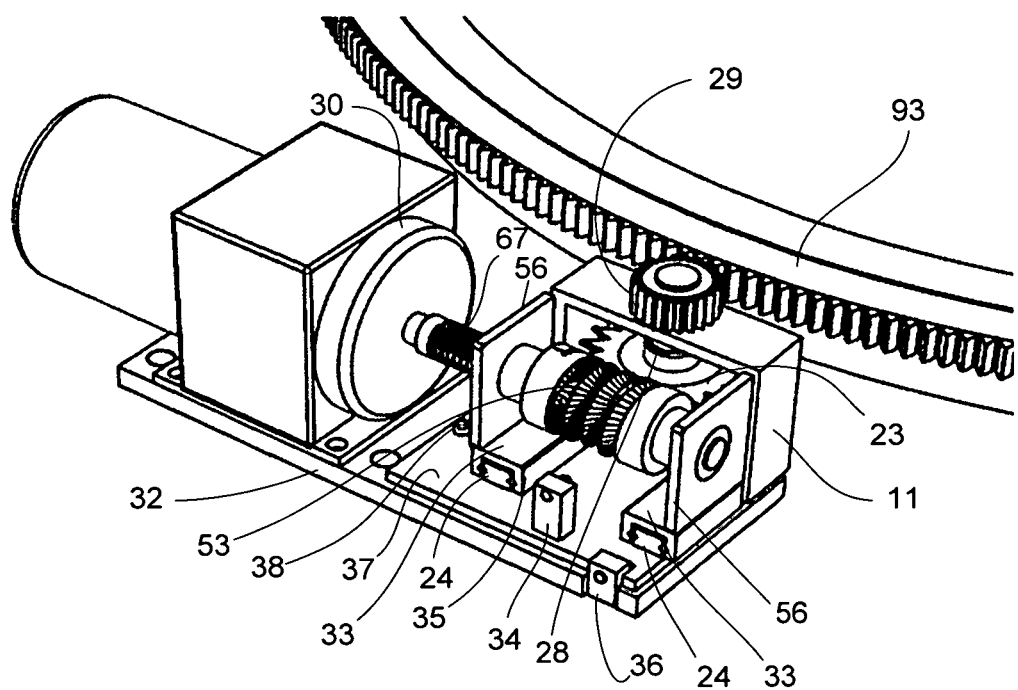
FIG. 4A is pictorial diagram of the right angle drive engaging a rotary stage gear.
Figure 4B:
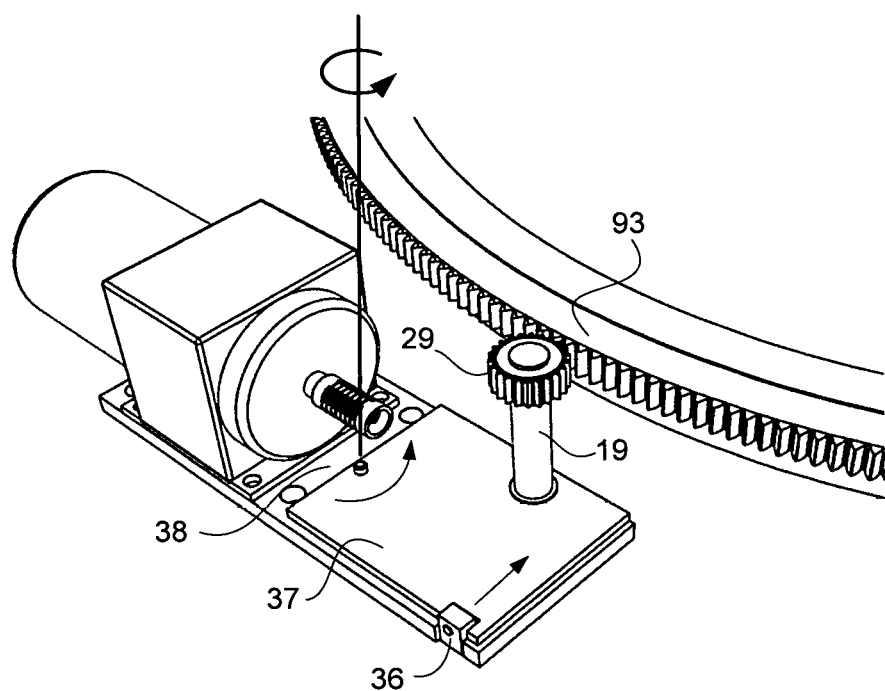
FIG. 4B is a pictorial diagram of the mechanism for preloading the drive spur gear against the stage spur gear.
Figure 4C:
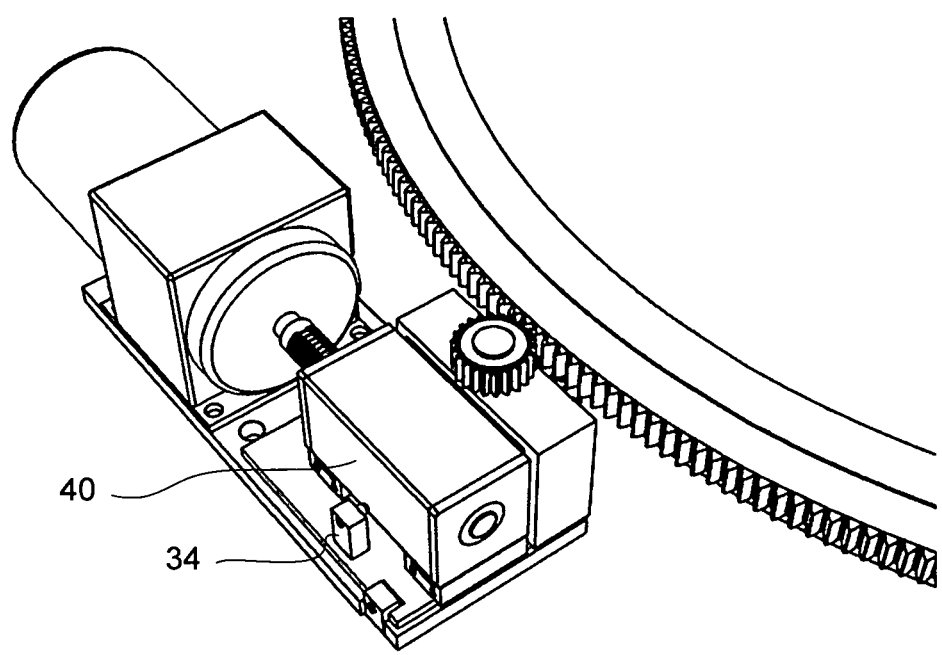
FIG. 4C is a pictorial diagram of the mechanism for preloading the globoid worm against the star gear.

FIG. 4A is a depiction of the engagement of the gearing of the disclosed drive mechanism, applicable to multiple embodiments of the disclosed device. A common mounting plate 32 supports the drive motor 30 and fixtures for the globoid worm 53 and the star gear 23 with associated spur gear 29. The star gear mounting bracket 11 is affixed to rotatable plate 37 that is permitted to rotate about pivot pin 38. The purpose of rotatable plate 37 is to allow an independently adjustable preload of the drive spur gear 29 and the stage spur gear 93. This is shown in detail in FIG. 4B wherein ball plunger 36 exerts a force on plate 37 thereby preloading the spur gear 29 against rotation stage gear 93. The globoid worm support plates 56 are mounted on slides 33 on linear guide rails 24 to permit ball plunger 34 to preload the globoid worm 53 against star gear 23. The ball plunger 34 actually applies force to the globoid worm housing 40 affixed to the globoid worm support plates 56 as depicted in FIG. 4C. With reference again to FIG. 4A, the drive motor 30 drives the globoid worm 53 through flexible coupling 67. The globoid worm 53, under preload, engages star gear 23 thereby causing rotation of the spur gear 29, coaxially mounted with star gear 23. Spur gear 29, under preload, engages the rotation stage gear 93 resulting in the intended output motion. Although the globoid worm 32 and the star gear 23 are contained in separate housings to permit relative motion for preloading purposes, the two housings can be jointly sealed with flexible tape so that gear lubrication is fully contained and contamination is excluded from this gearing.

Second Embodiment—First Embodiment with Addition of Drive Subassembly

In a second embodiment, the device comprises three subassemblies, specifically comprising a globoid worm subassembly, a star gear-spur gear subassembly, and a drive subassembly. With respect to FIG. 4A, the drive subassembly comprises the drive motor 30 and flexible coupling 67. Within the scope of this disclosed right angle drive, an alternative drive subassembly may comprise a manual actuator such as a thumbwheel, or mechanical interfaces to various other power or actuation sources well known in the prior art, such as piezoelectric, magnetostrictive, hydraulic, etc.

Third Embodiment—Second Embodiment with Addition of Stage Gear Subassembly

In a third embodiment, the device comprises four subassemblies, specifically, these are: a globoid worm subassembly, a star gear-spur gear subassembly, a drive subassembly, and a stage gear subassembly. The stage gear subassembly is configured after the fashion of the integrated bearing concept disclosed in U.S. Patent Application Number US 2011/0317951, which is incorporated herein by reference thereto. The advantages of this bearing concept over conventional bearings are many and enumerated in the aforementioned application.

The primary objects and applications of the integrated bearing concept are (1) a dedicated high precision, low to moderate load and low to moderate speed rotational positioning table or stage without the typical tradeoffs encountered by using conventional standard bearings that were fundamentally designed for other applications, and (2) the simplified customization and manufacture of a rotating cylinder for use in a precision rotary stage. Another important object and purpose of the integrated bearing concept is to eliminate the need to design or modify off-the-shelf conventional bearings which require highly precise mating seating features in order to adapt such bearings for a rotary table (or stage) application under conflicting or unachievable constraints. Generally, it is quite expensive to customize conventional bearings, thereby making it prohibitively expensive to modify such bearings to have the required dimensions and features of the desired end product.

The essence of this bearing concept is that it uses essentially "flat" conical sections where the only curvature is the natural cone radius. These sections mate with one another to form one or more pairs of V-shaped surfaces or corners, and are locked into place by a "ring" which can be fastened in a variety of new as well as conventional manners in order to facilitate applying a desired preload force to the bearings.

Figure 5:
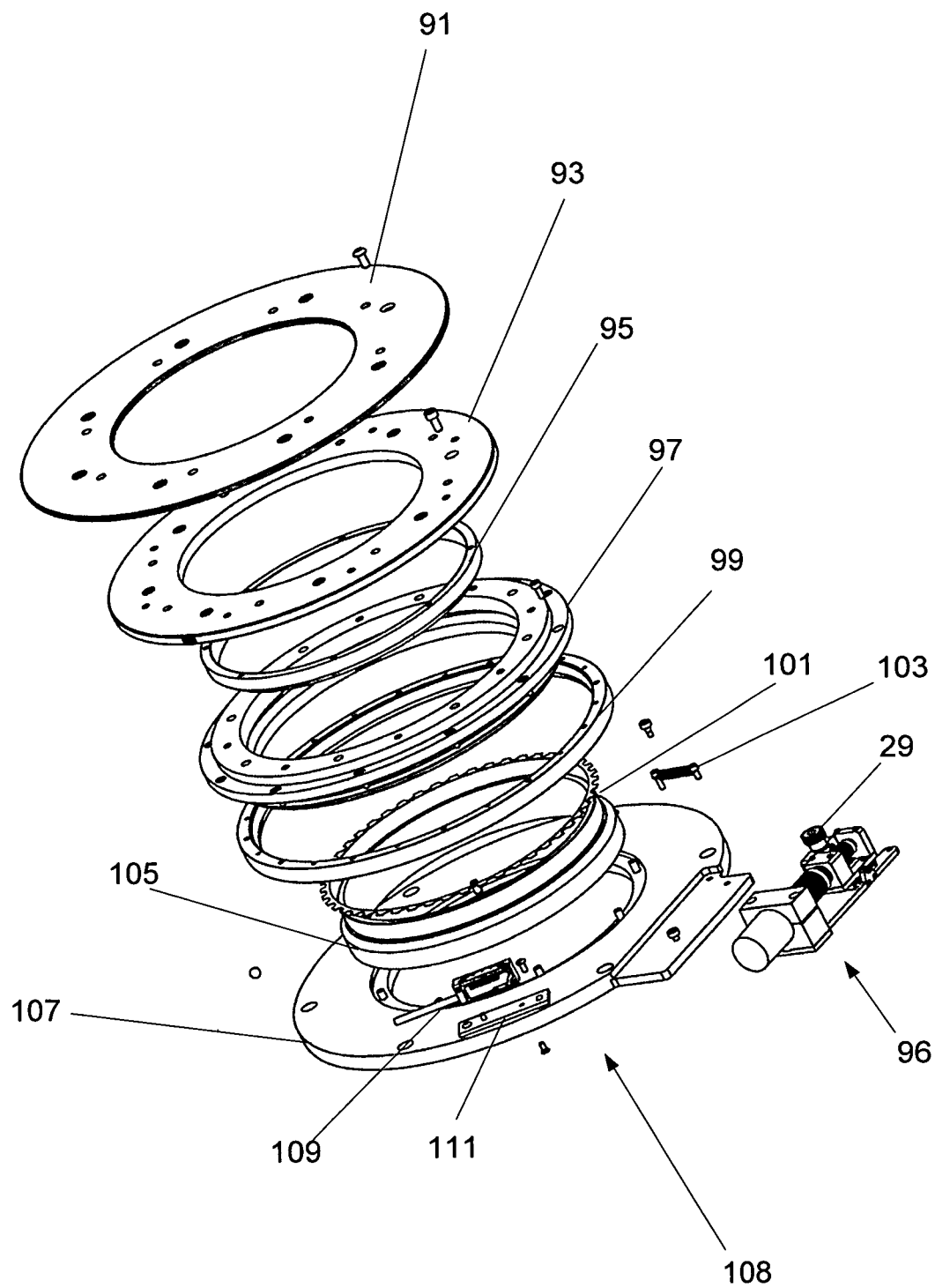
FIG. 5 is an exploded diagram of the stage gear subassembly.

Reference is made to FIG. 5, an exploded diagram of the stage gear subassembly 108 in relation to the composite assembly 96 (which comprises the globoid worm subassembly 3, the star gear-spur gear subassembly 5, and the drive subassembly 7). The stage design is typical with the rotational element placed inside the stage rather than outside. However the scope of the present disclosure includes outside placement.

Top mounting surface plate 91 and base mounting plate 107 captivate the bearing components. These components comprise large spur gear plate 93 which meshes with drive spur gear 29, partial v-groove take up ring 95, rotor primary member 97 with v-groove, an optional encoder ring scale 99, bearing keeper 101, and non-rotating member 105 with partial v-groove. Additionally, mounted to the base plate 107 is read head mounting plate 111 which supports attachment of an optional read head 109 to work with encoder ring scale 99. Quick release spring 103 is provided to allow manual rotation of the stage.

Figure 6:
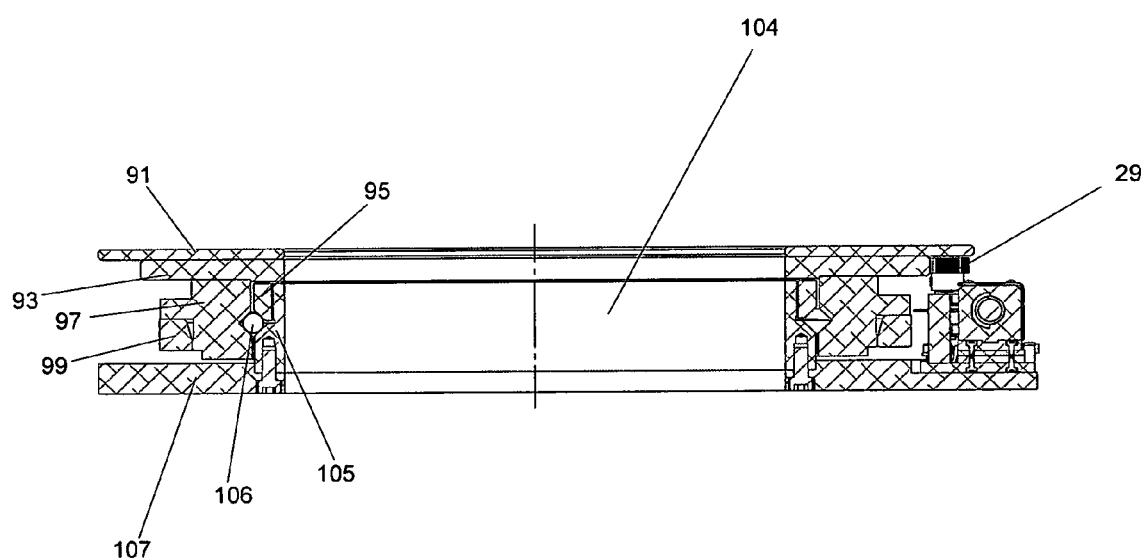
FIG. 6 is a cross-sectional diagram of the stage gear subassembly and the composite assembly.

The salient, novel components of the stage gear subassembly 108 are the key integrated bearing components, namely the partial v-groove take-up ring 95 which is the first half of the "inner bearing race", the rotor primary member 97 containing a fixed v-groove which comprises the "outer bearing race", and non-rotating member 105 with a partial v-groove which is the second half of the "inner bearing race". A conventional bearing keeper 101 also is depicted and is positioned within the bearing race formed by the inner and outer bearing race surfaces. Together, these components create the rotatable bearing. With reference to FIG. 6, a cross-sectional diagram of the stage gear subassembly 108 and composite assembly 96, it can be seen that this embodiment of the drive system offers a rotary stage with large clear aperture 104 and a small vertical dimension with a compact drive mechanism.

Figure 7A:
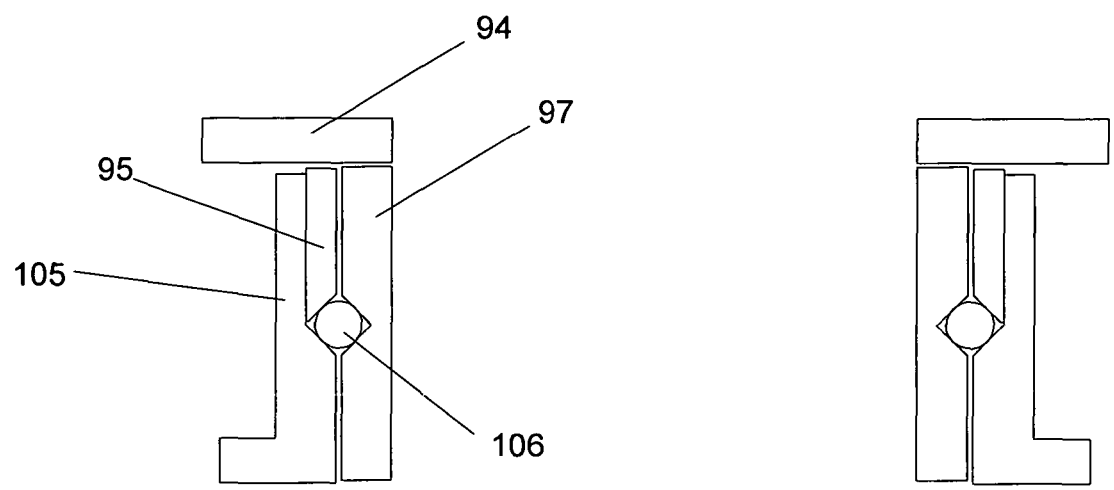
FIG. 7A is a cross-sectional diagram of the integrated bearing assembly with an inside rotor geometry.
Figure 7B:
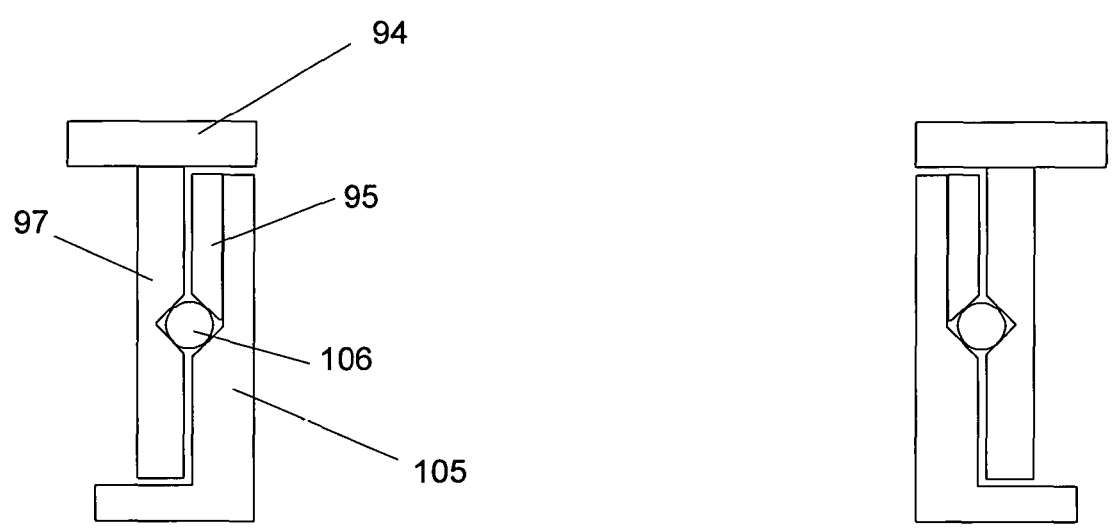
FIG. 7B is a cross-sectional diagram of the integrated bearing assembly with an outside rotor geometry.

The rotor primary member 97 can be implemented radially inside or outside of the fixed housing (elements 105 and 95) as shown in the cross-sectional renderings of the integrated bearing in FIGS. 7A and 7B, respectively. The bearing assembly can be adapted to various mounting surfaces 94.

The integrated bearing design permits flexibility of application and avoidance of need for custom bearing designs. This is because the bearing is straightforward to lathe or machine out of aluminum (or steel) and does not require high precision grinding of specialized races. Each new conventional bearing design requires very expensive tooling inappropriate for small quantity production. Most conventional bearing designs came from dedicated applications requiring tens of thousands of one type of bearing. Based on kinematic analysis, the most important feature of this integrated bearing design is its ability to maintain a fixed rotational axis (and hence, center of rotation) in the presence of errors in positioning of the component parts that form the bearing races. In addition to achieving this motion performance, the "self-seating" nature of the bearing race construction also results in a preloaded race with no deleterious space.

Figure 7C:
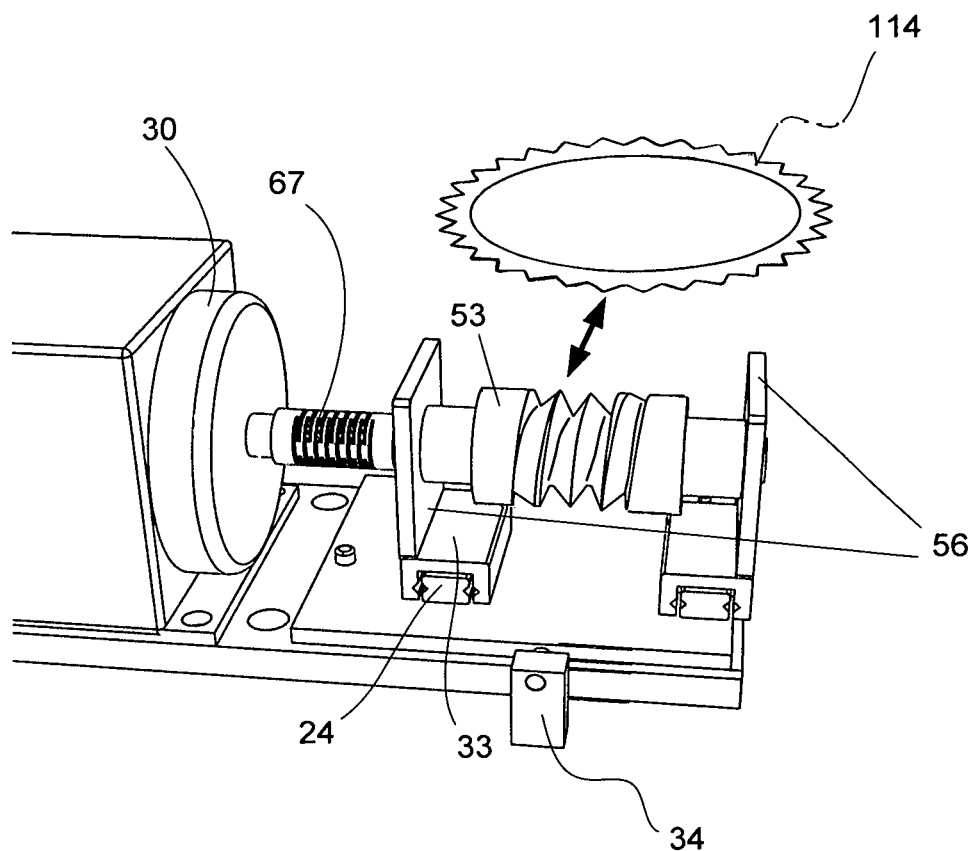
FIG. 7C is a pictorial diagram of an embodiment of the drive in which the globoid worm drives the rotary stage directly.

Fourth Embodiment—Globoid Worm Directly Driving Rotation Stage Star Gear with Integrated Bearing In a fourth embodiment, depicted in FIG. 7C, the globoid worm 53 directly drives the rotary stage gear 114 which takes the form of a star gear. To exploit the integrated bearing of FIG. 5 in this embodiment, the rotary stage gear 114 can replace the spur gear 93 of FIG. 5. Motor or prime mover 30 drives the globoid worm 53 through coupling 67. The globoid worm 53 and its mounting plates 56 are affixed to slides 33 mounted on guide rails 24. The globoid worm subassembly is preloaded against the rotary stage gear 114 by means of ball plunger 34. Alternative preload geometries include use of a pivoting support plate.

Figure 8A:
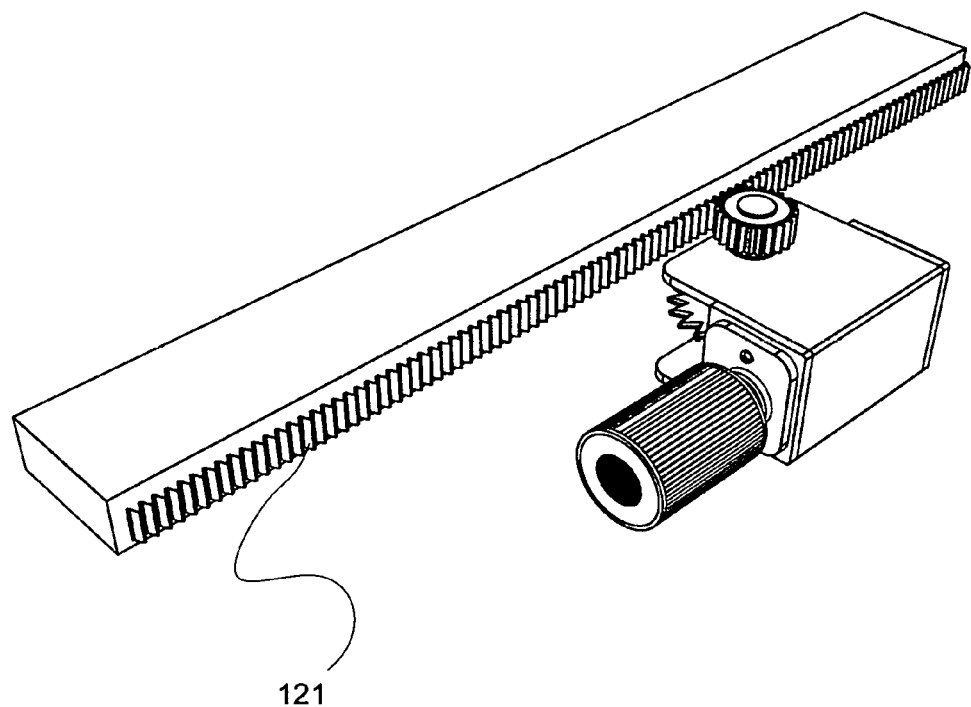
FIG. 8A is a pictorial diagram of the composite assembly engaging a linear gear.
Figure 8B:
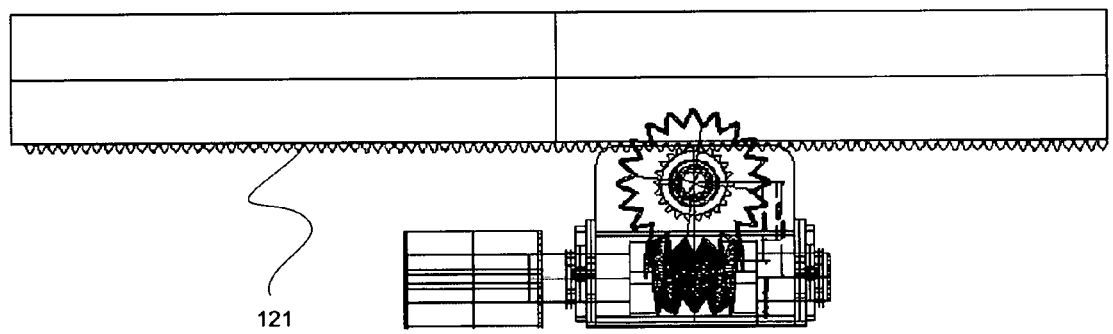
FIG. 8B is a schematic diagram of the composite assembly engaging a linear gear.

The stage gear subassembly can be in the form of a linear track, or rack, 121 as shown in the pictorial diagram of FIG. 8A. A plan schematic view of this implementation is shown in FIG. 8B.

Gear Materials and Manufacturing Methods

Well-known in the prior art are methods of improving material performance include hardening of gears before and after tooth cutting, nitriding, various types of induction hardening (including coil, tooth-by-tooth, dual and multiple frequency) carbo-nitriding and various types of carburizing.

Bronzes as well as some aluminum and zinc alloys display high strength combined with good sliding properties and can be used in worm wheels. The differential hardness of the worm wheel and globoid worm contribute to the proper "working-in" of the gear set. The sliding motion and force between the worm wheel and worm faces make it difficult for a lubricant to form a film. For this reason the worm wheel is most often made of phosphor bronze in order to avoid scuffing. To accelerate "working-in" of the gear set, an abrasive slurry can be used on the gear surfaces.

The preferred materials comprise use of machine brass for the globoid worm and a hardened steel, like stainless, for the star gear implementation of the worm wheel. The steel is approximately twice the hardness of brass. Other metals that may be used in lieu of brass, that exhibit similar hardness to brass, include bronze, copper, and nickel alloys. The use of ceramics, composites, and other alloys of various metals for gear construction are considered within the scope of the presently-disclosed right angle drive mechanism.

Star Gear

Figure 9A:
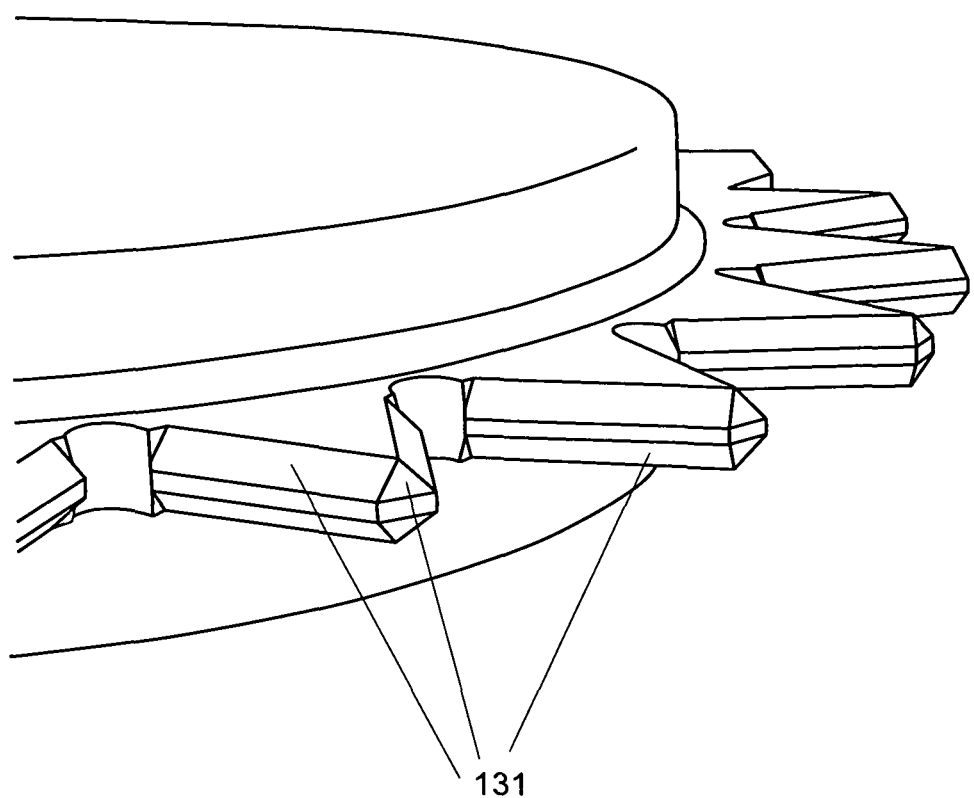
FIG. 9A is a pictorial diagram of a candidate star gear geometry.
Figure 9B:
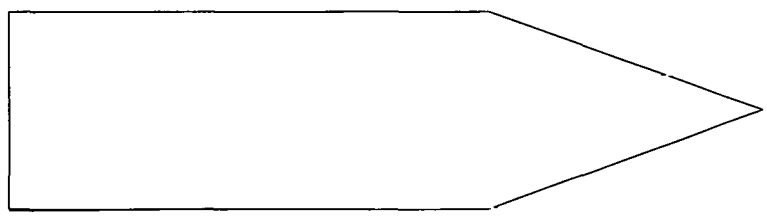
FIG. 9B is a cross-sectional diagram of a tapered star gear tooth.

The star gear is made relatively thin of a hard material like stainless steel or case hardened steel and can have milled or otherwise machined tooth surfaces 131 as shown in FIG. 9A. It can be wire cut or ground. The disposition (sizes and angles) of these surfaces can be optimized to support positioning accuracy and "working in" behavior when driving the globoid worm. An alternate tapered tooth geometry is provided in the vertical cross sectional view of FIG. 9B.

Globoid Worms

As stated, the globoid worm should be cut from a softer metal such as brass or bronze. Conventional methods of machining a globoid worm (pinion) use a cutting tool such as a grinding wheel that is capable of tilting in order to produce the enveloping shape.

Figure 10:
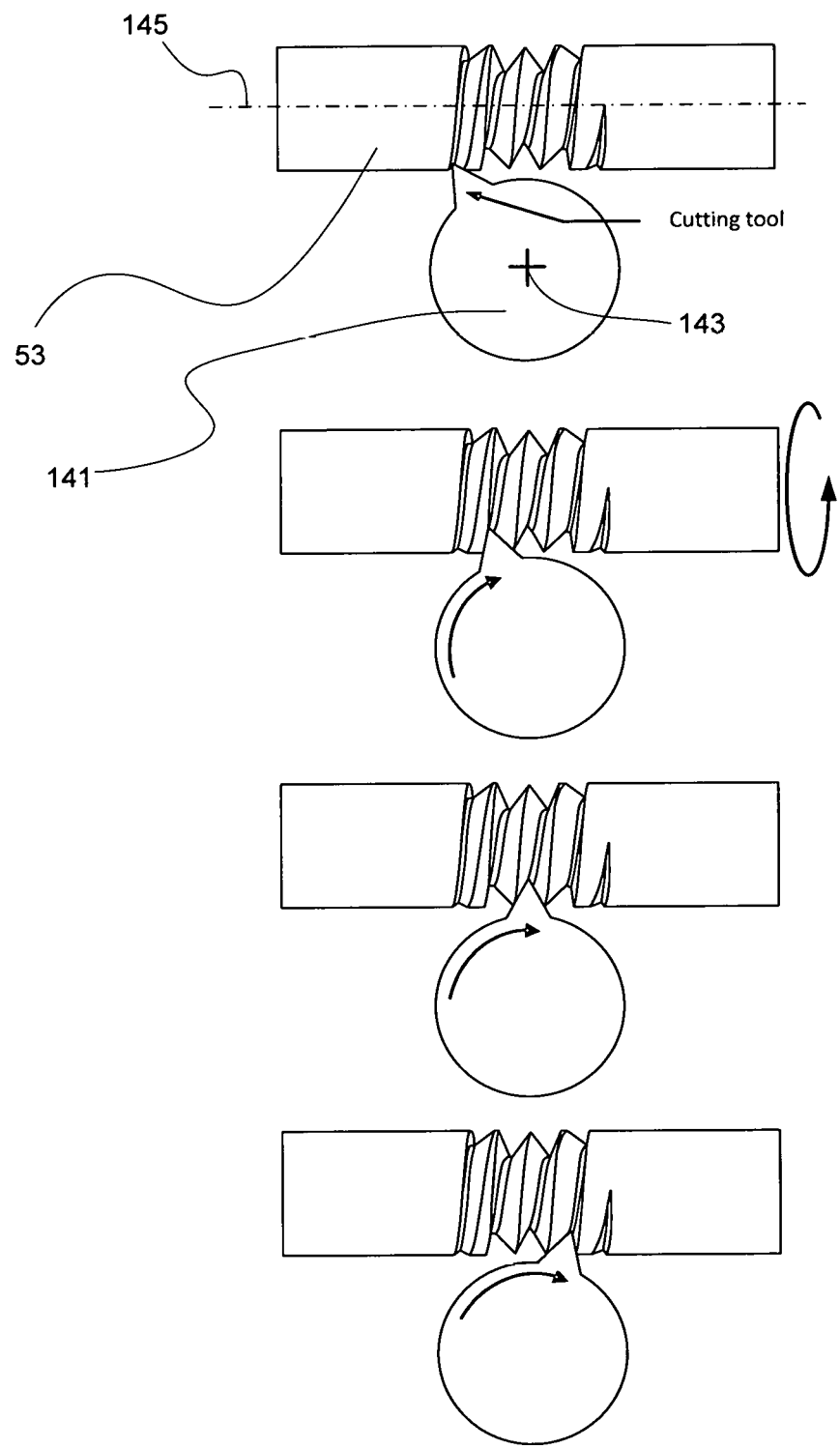
FIG. 10 is a sequence of pictorial diagrams depicting a method of manufacturing a globoid worm.

A preferred method of manufacturing the globoid worm is depicted in the diagrams of FIG. 10. The globoid worm 53 can be cut from a cylinder of brass using a cutting tool 141 that is essentially a single tooth version of the star gear. The cutting tool 141 revolves around an axis 143 through its center at a rate proportional to the revolution of the brass cylinder around its axis 145; a good ratio is 20:1 with the worm at the faster speed. The axis 143 of the cutting tool 141 is slowly advanced toward the globoid worm 53 being cut along a path perpendicular to axis 145.

The rotation of the cutting tool and that of the brass cylinder (globoid worm being cut) can be manually or electronically synchronized as is well known in the prior art. Likewise the advancement of the cutting tool axis 143 toward the brass cylinder can be under manual or programmed control.

Figure 11A:
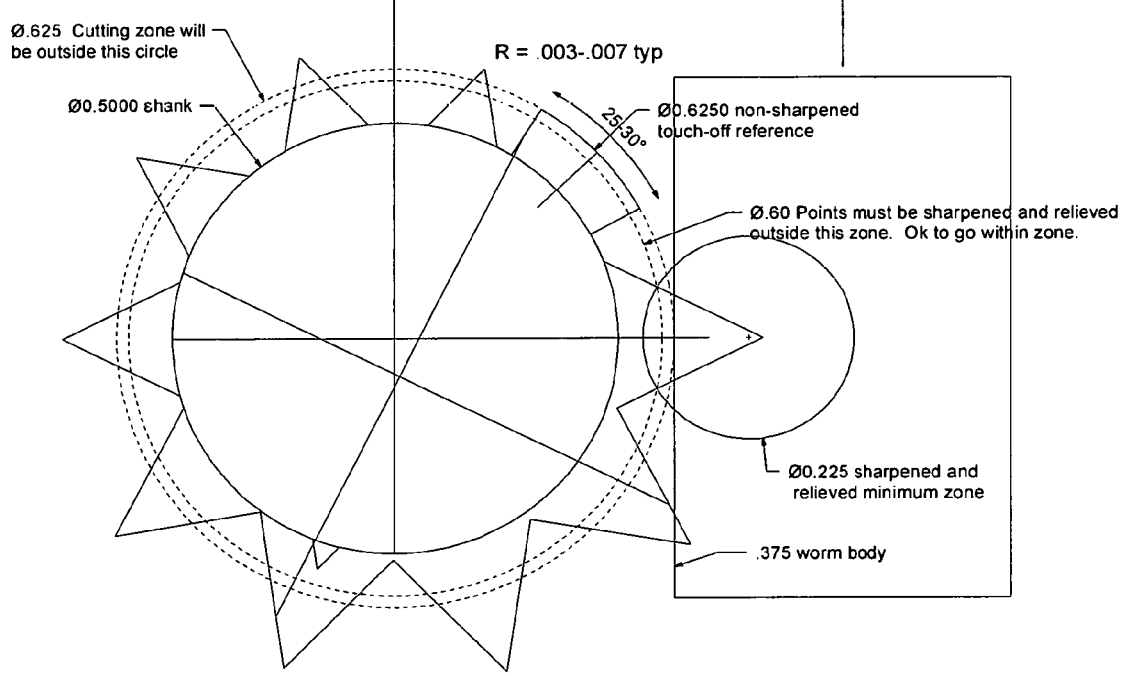
FIG. 11A is a schematic diagram of a multi-tooth globoid worm cutting tool.
Figure 11B:
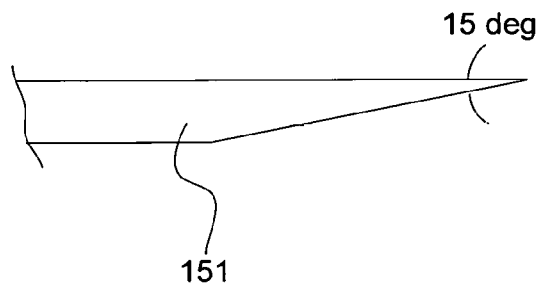
FIG. 11B is a cross-sectional diagram of the cutting tool tooth showing the relief angle.

FIG. 11A is a schematic diagram of a multiple tooth cutting tool with annotation of the critical angles and dimensions. FIG. 11B depicts the preferred geometry and relief angle of the cutting tool tooth.

Displacement Sensors

The disclosed precision drive can make use of any number of conventional linear or rotary encoder position sensors that are useful for differential and absolute position sensing and support closed loop control of motion. A low profile approach is to adapt a capacitive plate sensor after the fashion of U.S. Pat. No. 4,586,260 in the motion-controlled stage.

Preload Mechanisms

Various preload actuation schemes are within the scope of this disclosure and include springs, piezoelectric, and magnetostrictive devices.

What is claimed is:

1. A drive device for precision motion over a wide range of rotation stage gear diameters comprising: a globoid worm retained in a first gear subassembly, the first gear subassembly mounted on a first slide stage to permit motion transverse to the globoid worm rotation axis, the first gear subassembly under a first preload tension against a second gear subassembly by means of a first ball plunger, the second gear subassembly comprising a star gear with tooth angle greater than 30 degrees and a spur gear or helical gear mounted on a common shaft with the star gear and retained in the second gear subassembly, the first preload tension causing the globoid worm to engage the star gear, the first gear subassembly and second gear subassembly jointly-mounted on a second slide stage permitting joint motion of the first and second gear subassemblies transverse to the worm rotation axis, the second slide stage provides for a second preload tension by means of a second ball plunger which causes the spur gear to engage a driven spur gear under this second preload tension.

2. A device as recited in claim 1 wherein second slide stage is a stage that pivots around a single pivot point under the influence of the second preload tension.

3. A device as recited in claim 1 wherein the star gear is sufficiently thin to accommodate engagement of the star gear having a tooth angle greater than 30 degrees with a globoid worm without jamming.

4. A device as recited in claim 3 wherein the star gear is made of a hard material taken from the group comprising stainless steel, steel alloys, ceramics and the globoid worm is made of a softer material than that of the star gear taken from the group comprising brass, bronze, copper and nickel alloys.

5. A device as recited in claim 4 wherein the star gear is constructed from a stainless steel and the globoid worm is constructed from brass.

6. A device as recited in claim 1 the globoid worm exhibits an envelope with infinite radius of curvature.

7. A device as recited in claim 1 wherein a drive subassembly comprising a prime mover-driven drive shaft is coupled by means of the flexible coupling to the globoid worm retained in the first gear subassembly.

8. A device as recited in claim 1 which includes a third gear subassembly comprising a large stage gear mounted on an integrated bearing, the spur gear or helical gear caused to engage the large stage gear under preload by the second ball plunger.

9. A device as recited in claim 8 wherein the third gear subassembly includes an encoder ring scale and encoder read head.

10. A device as recited in claim 8 wherein the large stage gear is of infinite diameter.

11. A device as recited in claim 10 wherein the third gear subassembly includes a capacitive plate linear displacement sensor.

* * * * *